United States Patent [19]
Smith et al.

[11] Patent Number: 5,150,322
[45] Date of Patent: Sep. 22, 1992

[54] MIXED-RADIX SERIAL/PARALLEL MULTIPLIERS

[75] Inventors: Stewart G. Smith, Valbonne; Ralph W. Morgan, La Colle sur Loup; Julian G. Payne, Antibes, all of France

[73] Assignee: VLSI Technology, Inc., San Jose, Calif.

[21] Appl. No.: 534,597

[22] Filed: Jun. 5, 1990

[51] Int. Cl.$^5$ .............................................. G06F 7/52
[52] U.S. Cl. .................................................. 364/760
[58] Field of Search ................................ 364/760, 759

[56] References Cited

U.S. PATENT DOCUMENTS

| | | | |
|---|---|---|---|
| 4,546,446 | 10/1985 | Machida | 364/759 |
| 4,745,570 | 5/1988 | Diedrich et al. | 364/760 |
| 4,807,175 | 2/1989 | Tokumaru et al. | 364/760 |
| 4,864,528 | 9/1989 | Nishiyama et al. | 364/760 X |
| 4,965,762 | 10/1990 | Williams | 364/760 |

OTHER PUBLICATIONS

Smith and Denyer, *Serial Data Computation*, Kluwer Academic Publishers, 1988, pp. 144-149.
Ercegovac, M. D. and Nash, J. G., "An Area-Time Efficient VLSI Design of a Radix-4 Multiplier", *IEEE-ICCD 1983*, pp. 684-687.

*Primary Examiner*—Tan V. Mai
*Attorney, Agent, or Firm*—Bowles Horton

[57] ABSTRACT

A serial/parallel multiplier for the multiplication of a coefficient word with a data word of which the bits are broadcast n at a time where n is at least three. The structure comprises a plurality of pipes which where n is even each consists of a radix-4 encoder receiving two bits of the cluster and driving a partial product generator coupled to a respective carry-save array which forms the required two bits of the product by shifting and accumulation. For n equal to an odd number, the final sub-pipe consists of a radix-2 sub-pipe rather than a radix-4 sub-pipe and provides a single bit of the output, which consists of a cluster of n bits.

6 Claims, 6 Drawing Sheets

MIXED-RADIX SERIAL/PARALLEL MULTIPLIERS

FIELD OF THE INVENTION

The present invention concerns generally digital signal processing and more particularly digital signal processors which may, for example, be constituted by a very large scale integrated circuit. The invention is also in some aspects relevant to a digital signal processor which is automatically synthesized by means of a compiler.

BACKGROUND TO THE INVENTION

In digital signal processing, serial/parallel multiplication is usually performed with a radix of 2. This means that one operand is held in a parallel register while the other operand is broadcast one bit at a time. Partial products are formed by cross multiplication of the stored operated with the broadcast bit and are shift-accumulated to form the full product of the two operands. Normally all arithmetic is 2's complement.

The expression "radix-2" corresponds to one bit because the logarithm to the base 2 of 2 is unity. More generally, the radix X represents a cluster of N bits, where N is equal to the logarithm to the base 2 of X. Thus radix-4 represents a cluster of 2 bits, radix-8 represents a cluster of 3 bits and so on.

It is known, for example from Smith & Denyer, "Serial-Data Computation", Kluwer Academic Publishers, 1988, and also Ercegovac et. al. "An Area-Efficient VLSI Design of a Radix-4 Multiplier", IEEE-ICCD 1983, pages 684–687, to provide a radix-4 multiplier in which a modified-Booth recoding algorithm is employed to recode broadcast digits as signed quantities. Partial products may be formed by a combination of shifting, gating and inversion and the partial products may be shift-accumulated to form the full product. It is not usually beneficial to perform such recoding in radix-2 operation, which corresponds to the original Booth algorithm, and the equivalent recoding using a higher radix is inappropriate in serial/parallel multipliers, because the formation of partial products then requires multiplicative operations.

There are circumstances in which it is desirable to employ a digit size, that is to say the number of bit per digit, which is greater than 2. One example is given by the methods of realizing digital signal processors using a programmed compiler disclosed in our prior copending U.S. Pat. application Ser. No. 425634 filed 23 Oct. 1989, the disclosure of which is incorporated herein by reference. In the compiler and compilation methods described in tat earlier copending application, we disclose the use of "bits", "digits" and "subwords" as fundamental architectural attributes in automatic synthesis of digital signal processors. The term "bits" is used therein to refer to the ratio bits/digit and the term "digits" refers to the ratio of digits/subword. The quantity "subword" is used to refer to the ratio subwords/word, the product of the three attributes being the length of a digital word in bits. Individually, the number of bits per digit affects the maximum clock rate because sum and carry ripple path lengths are proportional to this attribute. In every design, "bits" is determined by appropriately factoring the word size, using the application task rate and a technology-specific component. The quantities "bits" and "digits" are global throughout the processor which is to be realized whereas the attribute "subwords", which determines the pipelining required from place to place in the processor, is a local attribute.

In order to facilitate realization of a digital signal processor, it is for reasons apparent from a consideration of our prior copending application No. 425634 and otherwise desirable to be able to operate at a digit size, namely the number of bits per digit, greater than 2. Digit sizes of up to 8, corresponding to a radix of 256, may be desirable and occasionally larger digit sizes may be required. However, a digit size greater than 2 corresponds to a radix greater than 4 and, as has been noted above, it is not desirable to employ such higher radix recoding for serial/parallel multipliers.

OBJECTS AND SUMMARY OF THE INVENTION

It is one object of the invention to provide a serial/parallel multiplication technique for operation at digit sizes greater than two bits per digit, i.e. at a radix of eight or more.

It is a further object of the invention to provide a serial/parallel multiplier which is suitable for high performance digital signal processing, and in particular for processing at digit sizes greater than two bits.

A further object of the invention is to provide multipliers which can implemented efficiently in terms of area and accordingly reduce the area and power required by a digital signal processor which employs such multipliers.

These and other objects of the invention are preferably achieved by means of pipelined serial/parallel multiplication and in particular the use of a multiplicity of radix-4 sub-pipes in parallel for even digit sizes greater than two and a plurality of radix-4 sub-pipes and a radix-2 sub-pipe for odd digit sizes greater than two. The sub-pipes are preferably arrays of carry-save adders which are latched at the boundary of the pipe constituted by the sub-pipes.

An aspect of the invention concerns therefore mixed-radix encoding. This is relevant in the automatic synthesis of digital processors wherein the digit size is selectable or variable. The invention enables the use of a synthesis algorithm wherein, at a digit size of one bit, no recoding is performed, at a digit size of two bits, radix-4 recoding is employed and at greater digit sizes, either mixed radix-2 and radix-4 recoding is employed or a multiplicity of radix-4 recodings is employed, according as the digit size is odd or even.

Other objects and features of the invention will be apparent from the following description which is given by way of example with reference to the drawings.

DETAILED DESCRIPTION

As indicated previously, the present invention concerns serial/parallel multiplications at radices between 1 and, for example 256, corresponding to a digit size from 1 to 8. Although it is not essential in all aspects of the invention, a serial/parallel multiplier according to the present invention may synthesized as part of the automatic synthesis of a very large scale integrated circiut. Reference may further be made to our prior copending U.S. application Ser. No. 425634 for a description of the production, as part of a process of automatic synthesis, of different forms of a pipelined multiplier according to the particular values of the local attributes which have already been discussed. It has already been pointed out that the digit size is a selectable parameter, though normally it will be global to a particular digital signal processor that is synthesized.

Generally according to the invention, serial/parallel multiplication is performed on a serial/parallel pipe. A 'pipe' as used herein preferably comprises an array of gated carry-save adders having latches at the outputs of the pipe. A sub-pipe is likewise an array of gated carry-save adders but has latches only at the end of the array. The difference between a pipe and a sub-pipe is that not all sub-pipe outputs are latched unless that sub-pipe forms the boundary of a pipe.

For a digit size of one bit, namely radix-2, no recoding is necessary. For a digit size of two bits, i.e. radix-4, modified Booth recoding may be used.. For digit sizes greater than 2 and even, the present invention contemplates the use of a plurality of radix-4 sub-pipes in parallel. For digit sizes greater than 2 and odd, one or more radix-4 sub-pipes in parallel may be used in addition to one radix-2 sub-pipe. A sub-pipe may be used for the higher digit sizes but not in the case of a digit size equal to unity because recoding techniques between radix-2 and radix-4 are compatible whereas radix-4 recoding and an ordinary 2's complement arithmetic are not compatible.

Figure 1:
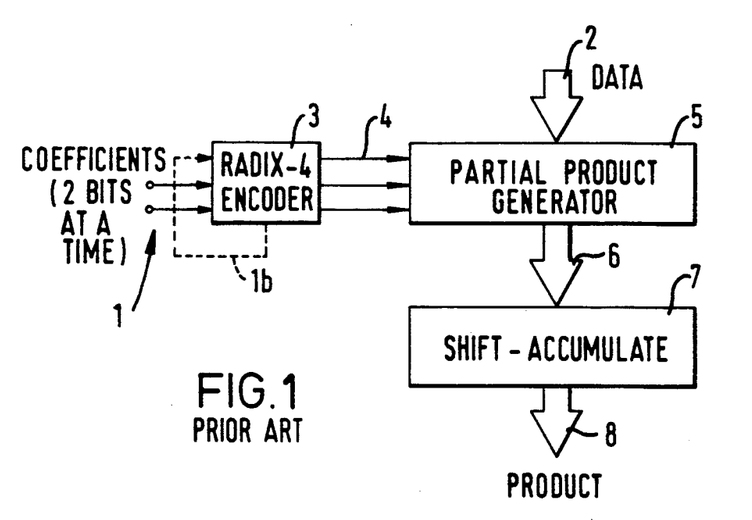
FIG. 1 illustrates a prior art radix-4 multiplier.

Before a discussion of specific embodiments of the invention, it is convenient first to refer to FIG. 1 which represents the prior art of a radix-4 multiplier employing modified Booth recoding. FIG. 1 is a schematic version of the radix-4 multiplier described by Ercegovac in the reference aforementioned.

In a multiplier as shown in FIG. 1, the coefficients of a multiplier are fed, usually by means of a shift register, two bits at a time to inputs 1 for multiplication with the bits of the multiplicand provided on parallel lines 2. The input coefficient bits are received by a radix-4 encoder 3 and the outputs thereof are coupled by lines 4 to a partial product generator 5 which, in the manner described by Ercegovac et. al., forms partial products which are fed out on lines 6 to carry-save cells constituting a shift-accumulate array 7 which produces an ultimate product fed out on parallel lines 8.

The radix-4 encoder 3 receives the input data in overlapping triplets, each pair of inputs being recoded with the more significant bit of the next most significant pair. This is indicated in FIG. 1 by the dashed line 1b.

Modified-Booth recoding follows the scheme shown in Table 1 below, wherein i0, i1 and i2 are the three inputs:

TABLE 1

| i2 | i1 | i0 | recoded digit | 3-bit representation of recoded digit | | |
|----|----|----|---------------|----------------------------------------|------|-------|
|    |    |    |               | minus (= i2) | zero | shift |
| 0 | 0 | 0 | 0 | 0 | 1 | 1 |
| 0 | 0 | 1 | +1 | 0 | 0 | 0 |
| 0 | 1 | 0 | +1 | 0 | 0 | 0 |
| 0 | 1 | 1 | +2 | 0 | 0 | 1 |
| 1 | 0 | 0 | −2 | 1 | 0 | 1 |
| 1 | 0 | 1 | −1 | 1 | 0 | 0 |
| 1 | 1 | 0 | −1 | 1 | 0 | 0 |
| 1 | 1 | 1 | 0 | 1 | 1 | 1 |

The recoded data form a radix-4 partial product directly from a radix-2 coefficient by gating and/or shifting. The radix-4 encoder generates the functions 'zero' and 'shift', to which are broadcast to the partial product generator along with the input bit i2; the last-mentioned is used as a sign bit to invert the selected partial product.

For further explanation of the construction and manner of operation of a radix-4 multiplier using modified-Booth recoding, the reader is referred to the Ercegovac article already mentioned.

Figure 2:
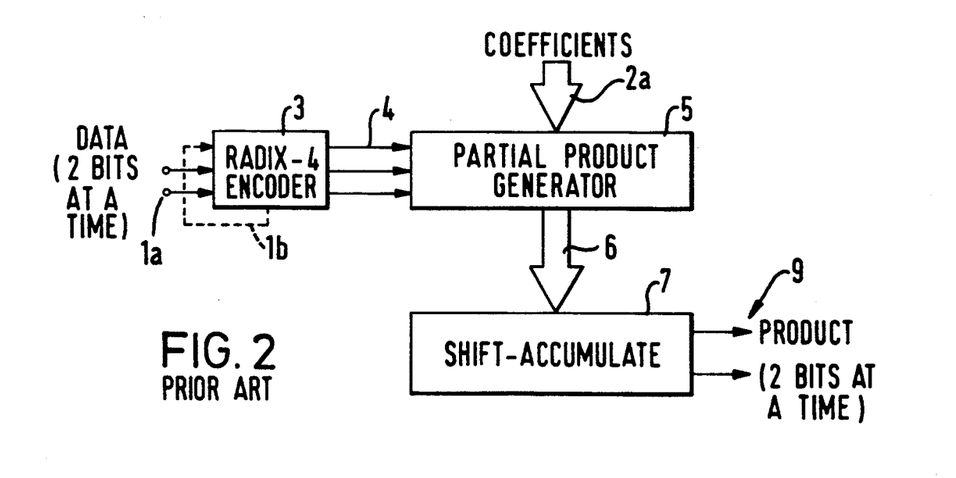
FIG. 2 illustrates another prior art radix-4 multiplier.

FIG. 2 illustrates another prior art multiplier and corresponds to FIG. 6.10 in the Smith & Denyer reference.

In the multiplier according to FIG. 2, data is fed two bits at a time to the input 1a f a radix-4 encoder, the functions zero and shift being fed out along with the signal i2 on lines 4 to a partial product generator 5 for the formation of partial products of the input data and the coefficients of the multiplier appearing on parallel lines 2a. Partial products are provided on parallel lines 6 to a shift accumulate array 7 and the output product is fed out on lines 9 two bits at a time.

Figure 3:
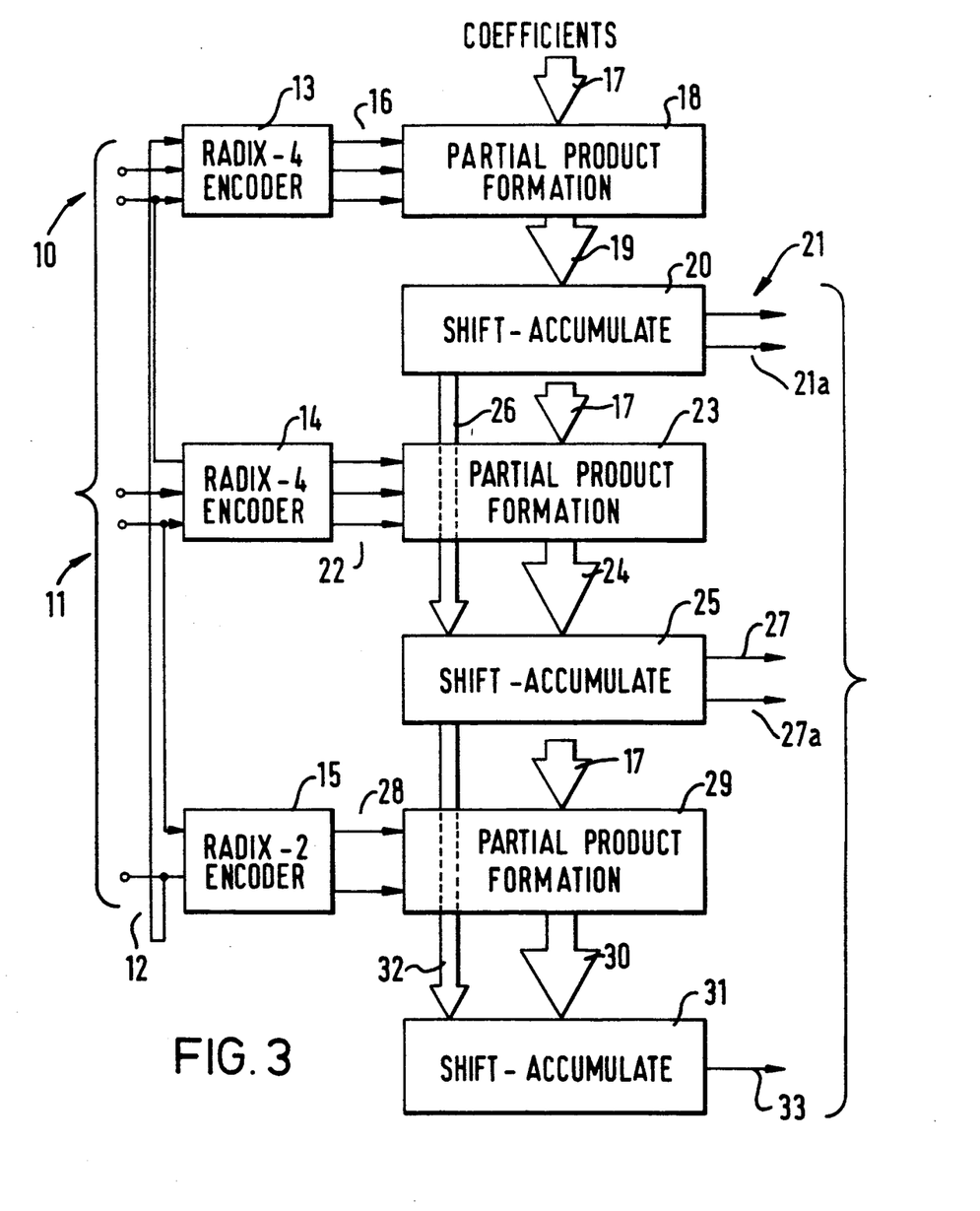
FIG. 3 illustrates a 5-bit serial/parallel multiplier.

FIG. 3 illustrates schematically one form of a mixed radix serial/parallel multiplier according to the invention. This embodiment is of a serial/parallel multiplier for a digit size of five. This means that the data is broadcast in clusters of five bits. The inputs for the five bits in each cluster are shown at 10, 11 and 12, inputs 10 receiving the first two bits, inputs 11 receiving the third and fourth bits and input 12 receiving the fifth bit in the cluster. Again, overlapping groups are used so that the first two bits and the fifth bit are input to a first radix-4 encoder 13 to provide recoded outputs on lines 16; partial products are formed with the (parallel) coefficients 17 by means of a partial product generator 18. The partial products are output on lines 19 to a shift-accumulate array 20, which provides two bits of the final output on lines 21 and 21a.

The second, third and fourth bits are input to a second radix-4 encoder 14 to provide recoded outputs 22. There is partial product formation (23) by similar means to the generator 18. Partial products are coupled with partial products formed by the first sub-pipe 20 to a shift-accumulate array 25, which provides two bits of the output on lines 27 and 27a.

The fourth and fifth data bits in the cluster are fed to a radix-2 encoder 15 to provide two outputs constituting a two-bit representation of a recoded digit in accordance with TABLE 2, which is a radix-2 Booth truth table.

TABLE 2

| i1 | i0 | recoded digit | 2-bit representation of recoded digit | |
|---|---|---|---|---|
| | | | minus (= i1) | zero |
| 0 | 0 | 0 | 0 | 1 |
| 0 | 1 | +1 | 0 | 0 |
| 1 | 0 | −1 | 1 | 0 |
| 1 | 1 | 0 | 1 | 1 |

The 'minus' and 'zero' digits are fed to a partial product generator 29 which is also coupled to the coefficient inputs and from which the partial products are fed on lines 30 to a third shift-accumulate array 31. This is coupled also to the shift-accumulate array 25 by means of lines 32 and provides a final bit of the output on a line 33. The outputs of the three shift-accumulate arrays, namely the outputs from the sub-pipes, are broadcast five bits at a time from the outputs puts 21, 21a, 27, 27a and 33 of the shift-accumulate array.

The technique generally indicated in FIG. 3 may be extended generally to larger numbers of bits, i.e. greater digit sizes. Where the digit size is three or a greater odd number, the serial/parallel multiplier will comprise a multiplicity of sub-pipes each having a respective radix-4 encoder, a partial product generator and a shift-accumulate array and a final sub-pipe having a radix-2 encoder, a partial product generator and a shift accumulate array. Where the digit size is four or a greater even number, the serial/parallel multiplier will consist of a multiplicity of similar sub-pipes each having a respective radix-4 encoder, a partial product generator and a shift accumulate array.

Figure 4:
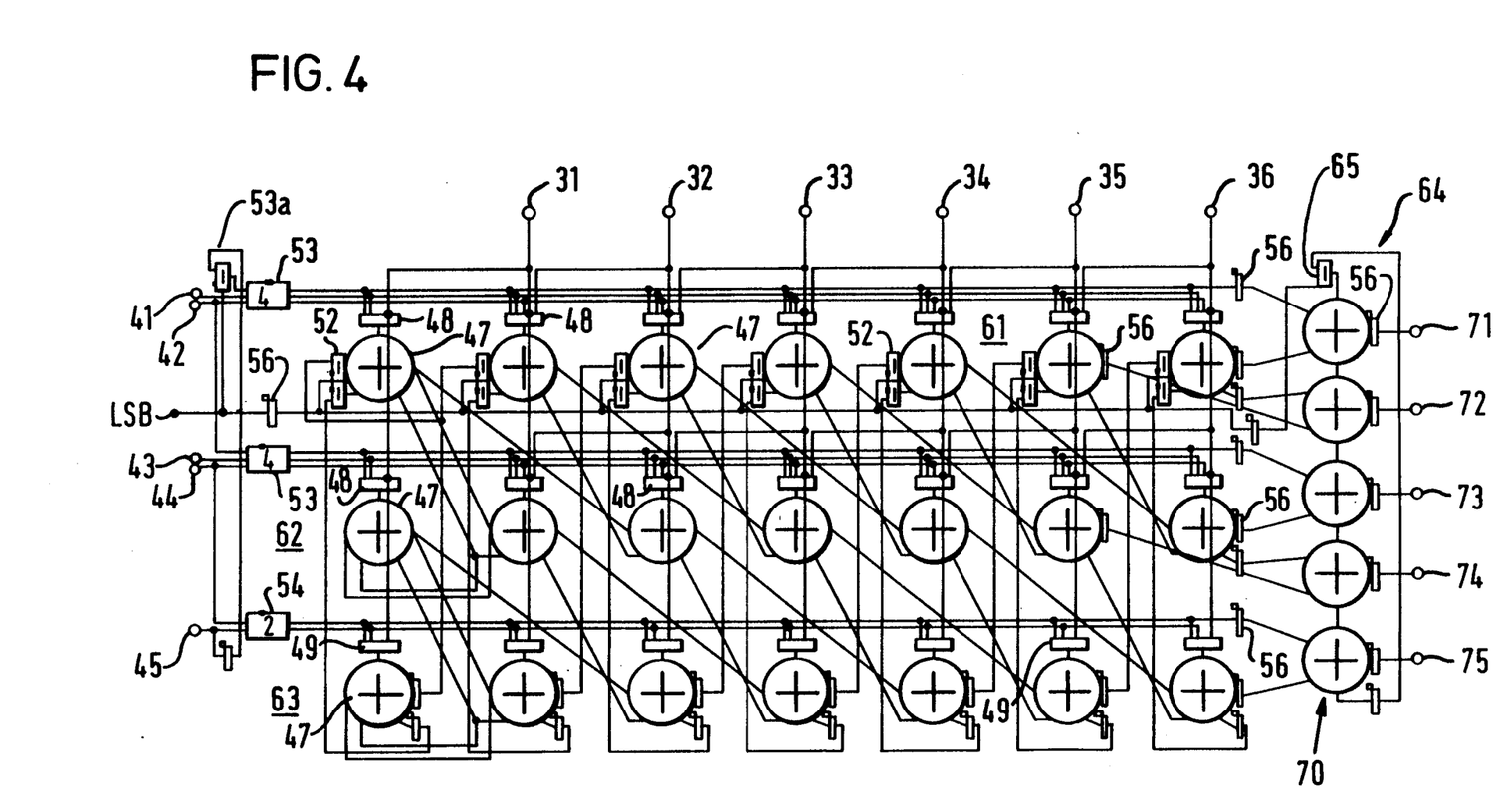
FIG. 4 illustrates a specific embodiment of a 5-bit serial/parallel multiplier according to the invention.

FIG. 4 illustrates a specific embodiment of the multiplier shown in FIG. 3.

In FIG. 4, the inputs 41 to 45 are the inputs for each cluster of five bits and correspond to the inputs described with reference to FIG. 3. The multiplier comprises three sub-pipes 61, 62 and 63, each composed of carry-save adders 47. The adders of the first array have input multiplexers 52 coupled to an LSB (least significant bit) line by way of latch 56. These latches and the other latches in the display are illustrated as upright rectangles with an adjacent square representing a clock input. The radix-4 encoders are shown at 53 for each of the first two sub-pipes and the radix-2 encoder is shown at 54 for the third sub-pipe. The outputs of the encoders are latched. The inputs for the coefficients (in this case a 6-bit word) are 31 to 36 respectively. The adders of the radix-4 sub-pipes 61 and 62 are each associated with a radix-4 product generator 48 of known form, whereas the adders of the radix-2 sub-pipe each have a radix-2 product generator 49 of known form. The radix-4 partial product generators are five-input generators whereas the radix-2 partial product generators are three-input generators; the apparently unconnected inputs are actually grounded, the connections to ground being omitted for simplicity. The adders at the output ends of the radix-4 sub-pipes and all the adders of the radix-2 sub-pipe 63 are latched because the respective adders form the boundary of the pipe. For each adder the sum output is shown above the carry output.

The multiplier has an array 70 of gated adders, of which the sum outputs provide the final output bits on lines 71 to 75. For each sub-pipe there is a final adder or pair of adders (depending on whether the sub-pipe is a radix-2 or radix-4 sub-pipe).

In particular, the adder 71 is connected to the (i2) recoded output and the sum output of the last adder in the first sub-pipe whereas adder 72 is connected to the carry output of the last adder and the sum output of the penultimate adder of the first sub-pipe 61. The adders 73 and 74 are similarly connected to the sub-pipe 62. The adder 75 is connected to the (i1) data line of the radix-2 and to the sum output of the last adder of the sub-pipe 63.

The carry output of each of the adders in the array 70 is connected to the gating terminal of the adder next below it, the carry output of the lowest adder being connected via latched line 64 and a multiplexer 65 (controlled via two latches from the LSB line) of which the output is coupled to the gating terminal of the topmost adder in array 70.

The purpose of the multiplexer is to allow a zero to be inserted in the carry loop at LSB-time, thereby clearing the loop. The data recoding loop has a similar multiplexer 53a, because a trailing zero is assumed in the input data for the M-Booth algorithm to work.

The feed-forward connections from the adders 47 follow the established rules for iterative multiplication.

Figure 5:
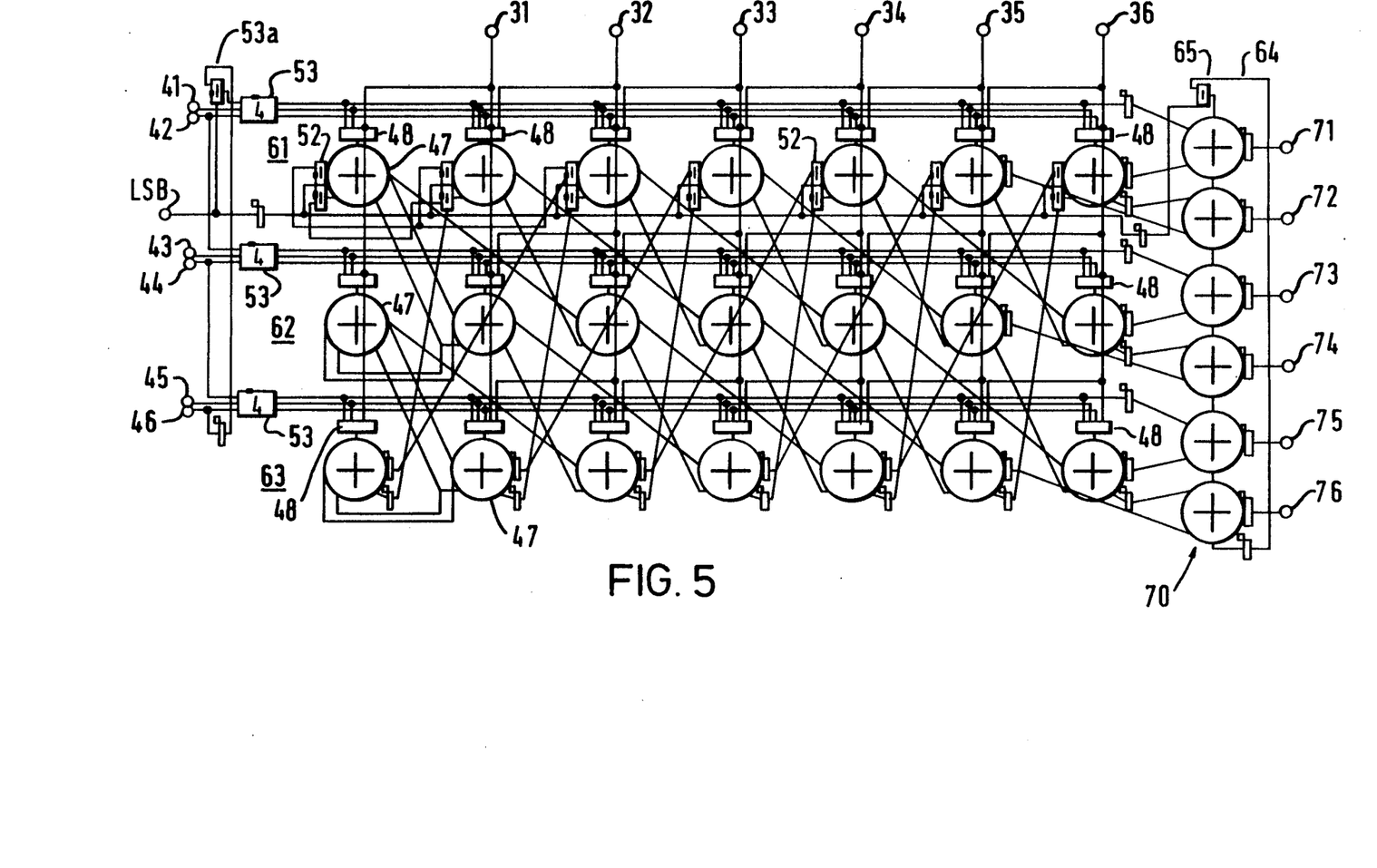
FIG. 5 illustrates a specific embodiment of a 6-bit multiplier according to the invention.

FIG. 5 shows a 6-bit serial/parallel iterative multiplier which is similar to that shown in FIG. 4. However, there is an additional input 46 for the sixth bit in the cluster, the radix-2 encoder 54 is changed to a radix-4 encoder 53 and the connections between the outputs of the carry-save adders and the inputs of the carry-save adders in the other sub-pipes are changed in accordance with the rules of partial product formation. The radix-2 product generators 49 are changed to radix-4 product generators 48 in the third sub-pipe Finally, there are six adders in the array 70 and six outputs 71 to 76 because the output data is broadcast six bits at a time. The adder 76 is connected to the carry output of the last adder in the third sub-pipe and to the sum output of the penultimate adder in the third sub-pipe.

The feedforward pattern of latched sum and carry signals from the boundary sub-pipe differs as between FIGS. 4 and because of the different relative weight of the outputs of a radix-4 sub-pipe and a radix-2 sub-pipe.

The multipliers shown in FIGS. 4 and 5 have several advantages. First, there is a substantial increase in speed relative to a multiplier in which the input data is broadcast one bit at a time. Second, the partial product formation does not require multiplication. Third, the scheme of employing radix-4 sub-pipes (or a mixture of radix-4 sub-pipes and a radix-2 sub-pipe) facilitates the automatic generation of the multiplier as part of a method of automatic synthesis of a digital processor in the form of a very large scale integrated circuit.

The multipliers shown in FIGS. 4 and 5 employ exclusively full adders for the sub-pipes. However, this is not essential, and one important modification enables a reduction in the hardware necessary for the multiplier.

In general, there is only one stage of accumulation hardware for each coefficient bit. However, it is known that in order to accumulate n words, only (n−1) adders are required It is possible therefore to consider a reduction of hardware in serial/parallel multipliers, based on adder-tree minimization theory.

Bit-serial (i.e. a 1-bit digit) is relatively simple. The leading adder may be discarded and the second replaced by a subtractor. Because carry signals recirculate locally in this case, the choice of subtractor is irrelevant. At a higher radix however carries are transmitted to neighboring cells and so design must proceed so as to avoid carry./borrow conflicts.

We have found that the leading two adding stages may be omitted from a radix-4 array and the technique may be generalized to higher radices.

Figure 6:
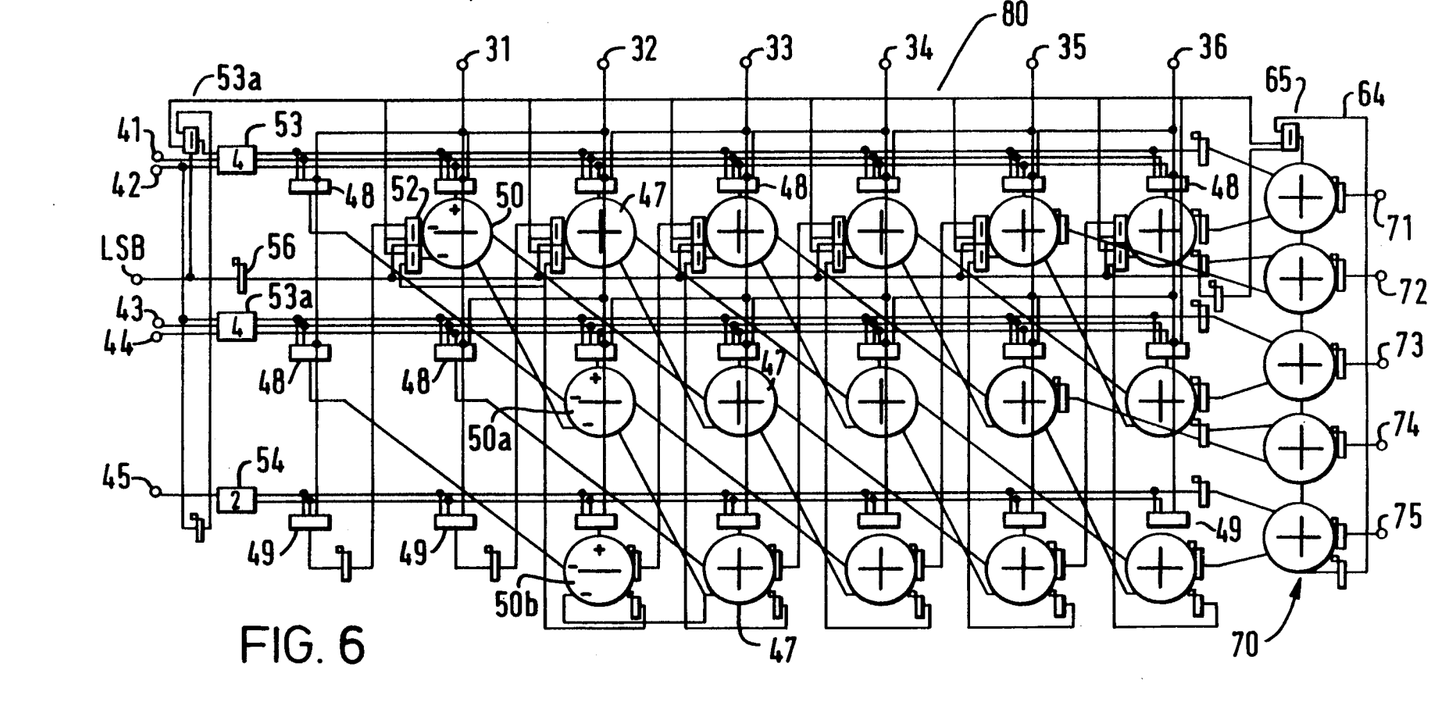
FIG. 6 illustrates a modified version of the multiplier shown in FIG. 4.

FIG. 6 illustrates a radix-32 (5-bit) iterative multiplier which operates in a manner equivalent to the multiplier shown in FIG. 4. However, the first two adders in the first sub-pipe have been omitted and replaced by a subtractor 50 in the position of the second adder, whereas the first three adders in the sub-pipes 62 and 63 are omitted and replaced by subtractors 50a and 50b in the positions of the third adders in the respective sub-pipes. Using this technique a typical digital signal processor can be substantially reduced in area.

FIG. 6 shows explicitly a ground line 80 omitted for convenience in FIGS. 4 and 5.

In the structures of FIGS. 4 to 6, partial products are formed concurrently but accumulated sequentially, the adders in sub-pipes are connected to those of other pipes in cascade. A tree structure may be used to alter the order of partial-product evaluation and is particularly beneficial at large radices because the three depth is related to log N instead of N, where N is the number of sub-pipes.

Tree structures can also be used to alter the evaluation order of partial product accumulation. For large radices this can produce considerable benefits.

Figure 7:
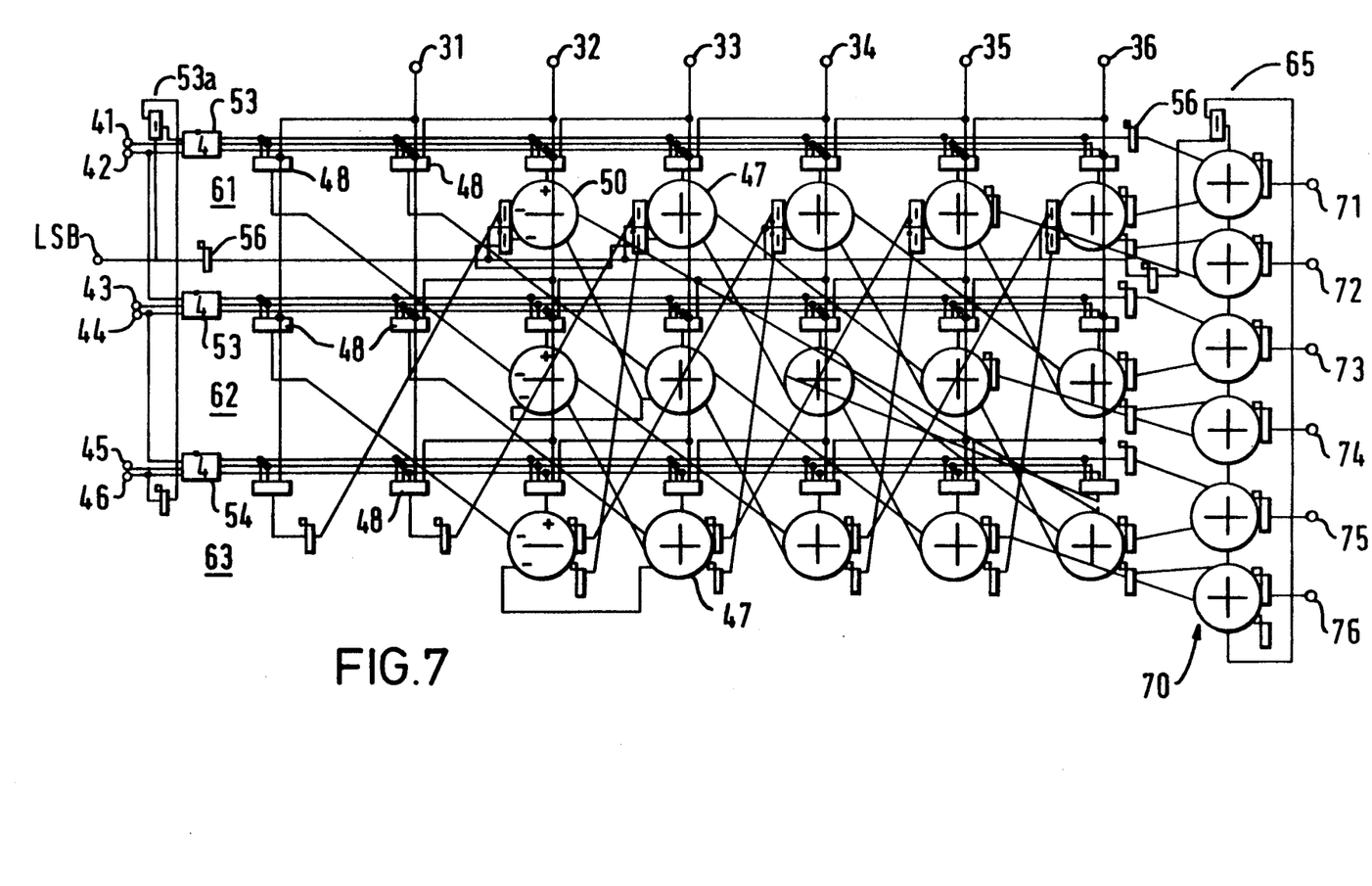
FIG. 7 illustrates a modification of the multiplier shown in FIG. 5.

FIG. 7 illustrates a 6-bit serial/parallel multiplier modified in accordance with a binary tree structure based on FIG. 5. Attention should be paid to the inputs and outputs of the adders on the top left to bottom right diagonal of the main gated adder array, as compared with FIG. 5. The 6-bit coefficient multiplier is only just large enough to illustrate the modification, which is repeated for longer multipliers.

What is claimed is:

1. A serial/parallel multiplier for the formation of a multiplicative product of a multiplicand having a multiplicity of bits and a multiplier having a plurality of coefficient bits, comprising:

means for receiving the bits of the multiplicand in clusters of n bits wherein n is greater than two, said receiving means having a plurality of groups of inputs wherein each group consists of not more than two;

and for each of the said groups:

a respective radix-N encoder wherein N is equal to two when the respective group consists of one bit and is equal to four when the respective group consists of two bits;

a radix-N partial product generator coupled to the respective radix-N encoder and to receive a respective coefficient bit; and a shift-accumulate sub-pipe coupled to receive partial products from the respective partial product generator and to provide a group of bits of the said product, the number of bits in this group being unity where N is two and two where N is four, the sub-pipes being interconnected and constituting together a processing pipe.

2. A multiplier as set forth in claim 1 wherein n is greater than 3 and even, the said groups all consist of two bits and for each group N is equal to four.

3. A multiplier as set forth in claim 1 wherein n is greater than three and odd, all but one of the said groups consist of two bits and the one group consists of one bit, and there being a plurality of radix-4 encoders and one radix-2 encoder for the said groups.

4. A multiplier as set forth in claim 1 wherein each shift-accumulate sub-pipe comprises an array of full adders.

5. A serial/parallel multiplier for the formation of a multiplicative product of a multiplicand having a multiplicity of bits and a multiplier having a plurality of coefficient bits, comprising:

means for receiving the bits of the multiplicand in clusters of n bits wherein n is greater than two and even, the receiving means having a plurality of groups of two inputs;

for each of the said groups:

a respective radix-4 encoder;

a radix-4 partial product generator coupled to the respective radix-4 encoder and to receive a respective coefficient bit; and a shift-accumulate sub-pipe coupled to receive partial products from the respective partial product generator and to provide two bits of the output product simultaneously with the provision of the respective bits from the other sub-pipes, the sub-pipes being interconnected and constituting together a processing pipe;

and feedforward connections between the subpipes.

6. A serial/parallel multiplier for the formation of a multiplicative product of a multiplicand having a multiplicity of bits and a multiplier having a plurality of coefficient bits, comprising:

means for receiving the bits of the multiplicand in clusters of n bits wherein n is odd and greater than two, said receiving means having a plurality of groups of two inputs and a group consisting of a single bit input;

and for each of the said groups:

a respective radix-N encoder wherein N is equal to two when the respective group consists of one bit and is equal to four when the respective group consists of two bits;

a radix-N partial product generator coupled to the respective radix-N encoder and to receive a respective coefficient bit; and a shift-accumulate sub-pipe coupled to receive partial products from the respective partial product generator and to provide a group of bits of the said product, the number of bits in this group being unity where N is two and two where N is four, the sub-pipes being interconnected and constituting together a processing pipe.

* * * * *